May 4, 1943. E. F. GRETHER 2,317,992
TREATMENT OF ORGANIC MATERIAL AND RESULTING PRODUCT
Filed April 10, 1940
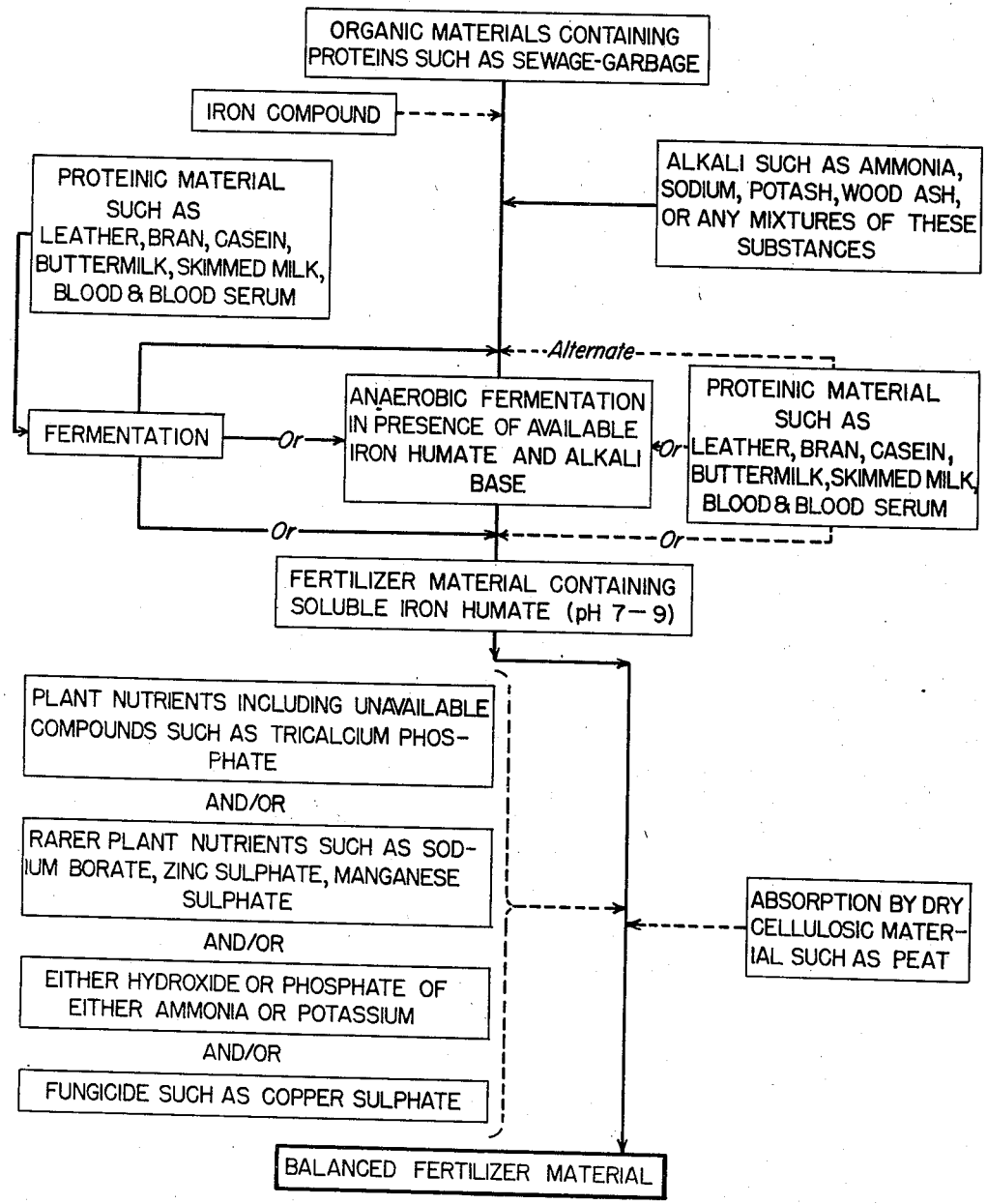
Inventor
ERNEST F. GRETHER
By Semmes, Keegin & Semmes
Attorneys

Patented May 4, 1943

2,317,992

UNITED STATES PATENT OFFICE 2,317,992

TREATMENT OF ORGANIC MATERIAL AND RESULTING PRODUCT

Ernest F. Grether, Midland, Mich., assignor to The Dow Chemical Company, Midland, Mich., a corporation of Michigan Application April 10, 1940, Serial No. 328,988

1 Claim. (Cl. 71—10)

This invention relates to the treatment of organic material, and more especially to a process for treating organic materials containing proteins, such as sewage and garbage, in order to convert these substances into a fertilizing material containing a plant stimulant.

Hitherto, sewage has been treated in various ways in an attempt to produce a product in a form which can be readily utilized as a fertilizer. Such processes usually involve the use of expensive apparatus and produce a sludge in which harmful pathogenic organisms are present. Moreover, as far as I am aware, a suitable process for converting garbage into fertilizer has not been provided, and this material is usually used as an animal food or is disposed of in some other manner, usually by incineration.

One of the objects of this invention is to provide a process whereby a proteinic waste material, such as sewage or garbage, may be converted into a fertilizer containing plant stimulants without the use of expensive machinery.

Another object of this invention is to provide a product comprising a new fertilizing material which also has plant stimulating values.

Still another object of this invention is to provide a new product comprising a fertilizer containing plant stimulants to which further substances containing plant nutrients have been added to make the product a balanced fertilizer.

A further object of this invention is to provide a material containing substances having peptizing properties.

With these and other objects in view, this invention relates to the adaptation of the process for treating humous materials, which has been disclosed in co-pending applications Serial No. 272,896, filed May 10, 1939; Serial No. 324,698, filed March 18, 1940; and Serial No. 324,849, filed March 19, 1940, in order that fertilizers containing substances having plant stimulating values may be produced from organic, nitrogenous starting waste materials other than humus, especially those materials in which the nitrogen is largely in a proteinic form. Of these substances, sewage and garbage are especially suitable to be used as a starting material for the process.

One of the principal features of the present invention resides in the discovery that, if the pH value of a material such as sewage or garbage is properly adjusted and the resulting mixture is subjected to an anaerobic fermentation which may be augmented by the addition of a suitable bacterial food, substances which act as plant stimulants are produced within the material. In order to produce these plant stimulants, it is necessary that the fermentation be conducted in the presence of a sufficient quantity of available iron humates, and it is possible that the presence of other compounds produced by the process is of assistance in accomplishing the desired result.

The single sheet of drawings is illustrative of one method of practicing this invention.

In practicing this invention, if garbage is selected as a starting material, it is usually ground. This is not necessary when sewage sludge is employed. Water is then added if necessary to the selected material until the moisture content forms at least 70 per cent of the total weight of the material.

When either raw sewage or garbage is selected as a starting material, a quantity of an iron compound is then added to the material. However, if a treated sewage from sewage disposal plants which has been previously treated with iron has been selected, sufficient iron may be present to cause this step in the process to be unnecessary, as material treated in this manner often contains a sufficient quantity of iron to serve in the process.

If the starting material does not contain sufficient iron, any iron compound, such as ferrous or ferric hydroxide or their salts, may be used and the material is then neutralized or rendered slightly alkaline by adding an alkali which may be in the form of any of the compounds of ammonium, sodium or potassium, preferably in aqueous solution. If desired, a solution of any two or more of these substances may be used or wood ashes may be utilized. Moreover, if desired, the mass may be neutralized first and the iron added afterwards. In any event, the alkaline material is added until the mixture has a pH value of at least 7 and preferably a value between 7 and 9. This pH is maintained throughout the process by introducing additional amounts of the alkaline material whenever necessary. This provides a suitable medium for the rapid production of bacteria.

The addition of the alkali base to the material causes the iron compound to be rendered available with the formation of a humate iron within the mass. The alkali employed also reacts to form salts which are retained in the fertilizer product but which do not interfere with the iron humate. For this reason an alkali, such as the compounds of ammonium or potassium which add food value to the product, is preferably employed although the compounds of sodium may be employed if desired.

The applicant has found that the presence of a sufficient quantity of iron humate and an alkali base is absolutely necessary in practicing his invention. The presence of these compounds in available form is the determining factor in producing, during the anaerobic fermentation, the desired increase in bacteria.

In this connection it should be noted that the alkaline earth metal compounds, particularly calcium carbonate, cannot be satisfactorily used since they render iron humate insoluble, and experiments have shown that the presence of soluble humates is necessary for the formation of the desired plant stimulant. However, the presence of small quantities of lime, such as are present in wood ashes, does not prevent the operation of the process as long as they are not present in sufficient quantities in their free state to furnish a pH value suitable for fermentation.

In order to promote the rapid growth of bacteria during the anaerobic fermentation, the presence of a sufficient quantity of nitrogenous material is necessary. Proteinic materials are especially desirable in this connection. Sewage and garbage have been found especially suitable as a starting material because they usually either contain sufficient proteinic material for the purpose without introducing additional material, or the quantity introduced can be much reduced. However, this may not be true of all types of garbage.

If it becomes necessary to add a proteinic material, it has been found that proteinic compounds, such as casein, albumin, bran, buttermilk, skimmed milk, blood and blood serum, and leather, can be employed most effectively. Buttermilk or skimmed milk is especially preferred in this connection and the bacterial count of the end product of the process will be greatly increased if the selected proteinic material, such as buttermilk, is subjected to a pre-fermentation before it is added to the process. The type of pre-fermentation will depend on the type of proteinic material selected. If buttermilk is selected, the pre-fermentation (lactobacter) occurs simply by subjecting the material for several days to a suitable temperature above room temperature.

The selected proteinic materials may be added before, during or after fermentation.

After the necessary materials have been added to the proteinic starting material and the ingredients have been thoroughly mixed, the resulting mixture is subjected to an anaerobic fermentation of from a few days to three months' duration at room temperature or at a temperature which is regulated at any desired point within the range between 15 and 25° C. In this connection it has been found that temperatures above 40° C. prevent the increase in growth of the type bacteria desired.

By the term "anaerobic fermentation" in this application is meant a fermentation which is fully anaerobic as distinguished from the aerobic-anaerobic fermentations usually disclosed in the prior art. In the process the humous material is reduced to a paste-like or liquid paste mass which will practically exclude the penetration of air to the interior of the mixture during fermentation.

During this fermentation it is believed that the protein is reduced to amines and amino acids and alcohols by the bacterial action. This bacterial action, aided perhaps by the enzymes produced, in the presence of soluble iron humate causes the formation of compounds within the material which have a stimulating action upon plant growth.

The material subjected to the fermentation is itself inoculated from bacteria in the air. The conditions present allow the type of bacteria which is suitable for conducting the fermentation to multiply at the expense of the less suitable types. The exact type of bacteria which develops under these conditions is not known although it is believed to be soil bacteria.

After fermentation it is often desirable to add one or more of the well known substances having plant food values to the resulting material so as to produce a balanced fertilizer. Substances, such as tricalcium phosphate, which are normally unavailable for plant use may also be utilized. These substances are rendered available in the soil by the peptizing action of the substances produced by the process.

Rarer plant nutrients, such as sodium borate, zinc sulphate and manganese sulphate, may also be added and, if desired, a fungicide, such as copper sulphate, and additional ammonia or potassium in the form of either a hydroxide or phosphate may also be added.

The substances added after fermentation are then thoroughly mixed to form a balanced fertilizer containing nitrogen, phosphorus, potash, rarer plant nutrients and plant stimulating substances. This product may be either air dried under outdoor sheds before storing or cellulosic materials, such as dried peat or a dried humous material, may be added to absorb the moisture so as to produce a product which may be easily stored or readily applied to the soil.

In addition to being a balanced fertilizer because of the materials added after fermentation, a product of this process also contains plant stimulants because the growing action on plants is in excess of this content. Manure and good compost are also in a certain degree plant stimulants when the term is used in this sense.

The bacteria contained within the end product are believed to be partly responsible for this plant stimulating action and their presence renders the soil minerals more available. In addition, the stimulation products which are released from nitrogenic-proteinic, and other materials through their action increases the appetite of the plants. This increase in appetite results in the consumption by plants of larger quantities of mineral elements as well as carbon dioxide. That plant stimulants are present has been shown by numerous experiments with soils rich in organic substances. In these experiments it was found that the addition of mineral fertilizers to this soil did not influence the growth of plants, while the addition of fermented material of the type described increased growth 50 per cent or more. Experiments have shown that there are plant stimulants in addition to soluble iron humate present and that these stimulants are probably formed by the presence of the soluble iron humate during the fermentation of this material.

Moreover, some of these unknown substances are peptizing agents and have a marked ability to peptize rock phosphate so as to make it soluble and therefore available for plant nourishment. For this reason these substances are especially suitable for use on soils which contain or to which has been added insoluble phosphate rock, and this material may be mixed with the end product of the process in the manner which was previously described.

While for purposes of illustration one method by which this invention can be carried out has been described and all of the steps have been suggested, it is obvious that various changes may be made in the process and numerous substances which are equivalents of the ones mentioned may be added without departing from the spirit of this invention.

It is, therefore, to be understood that this invention be only limited by the prior art and the scope of the appended claim.

I claim:

A method of treating proteinic material to produce a plant stimulant, plant nutrients and to cause an increase in the bacterial count within the mass, which comprises subjecting proteinic material to fermentation under substantially anaerobic conditions at temperatures between 15° and 40° C. in the presence of a water-soluble iron compound, an alkali base in amount sufficient to give the mixture a pH value between 7 and 9 and sufficient water to form a paste of the mixture.

ERNEST F. GRETHER.